United States Patent

Couch, Jr.

[11] 4,421,970
[45] Dec. 20, 1983

[54] COOLING AND HEIGHT SENSING SYSTEM FOR A PLASMA ARC CUTTING TOOL

[75] Inventor: Richard W. Couch, Jr., Hanover, N.H.

[73] Assignee: Hypertherm, Incorporated, Hanover, N.H.

[21] Appl. No.: 365,466

[22] Filed: Apr. 5, 1982

Related U.S. Application Data

[62] Division of Ser. No. 230,025, Jan. 30, 1981, Pat. No. 4,361,748.

[51] Int. Cl.³ .............................................. B23K 9/00
[52] U.S. Cl. ...................... 219/121 PV; 219/121 PP; 219/121 PQ; 219/121 PY
[58] Field of Search .................... 219/121 PP, 121 PY, 219/121 PU, 121 PQ, 121 PM, 121 PC, 75, 74, 76.16, 61.7; 313/231.4, 231.5, 231.6

[56] References Cited

U.S. PATENT DOCUMENTS

| | | | |
|---|---|---|---|
| 3,148,263 | 9/1964 | Jensen | 219/121 P |
| 3,641,308 | 2/1972 | Couch, Jr. et al. | 219/121 P |
| 4,203,022 | 5/1980 | Couch, Jr. et al. | 219/121 P |

*Primary Examiner*—M. H. Paschall
*Attorney, Agent, or Firm*—Kenway & Jenney

[57] ABSTRACT

A plasma arc cutting torch cools its nozzle with a water flow between an inner metallic nozzle member and an outer ceramic nozzle member. A set of auxiliary ports formed in the ceramic element each extend from an associated radial channel that directs a portion of the water to the plasma arc where it forms an annular "jet" that constricts the arc. The auxiliary ports are located and sized to provide an enhanced flow of water through the nozzle while maintaining an optimal flow rate through the radial channel. When a gas flow through the cooling passages is used to sense the height of the torch over a workpiece, the gas flow through the auxiliary ports clears residual water from the nozzle to avoid a false height sensing due to an emission of droplets of the water.

1 Claim, 2 Drawing Figures

COOLING AND HEIGHT SENSING SYSTEM FOR A PLASMA ARC CUTTING TOOL

This is a division of application Ser. No. 230,025 U.S. Pat. No. 4,361,748, filed Jan. 30, 1981.

BACKGROUND OF THE INVENTION

This invention relates in general to plasma arc cutting torches and more particularly to an improved nozzle construction that provides enhanced cooling and a more reliable initial height sensing.

The present invention is an improvement over the cutting torches and height sensing method described in U.S. Pat. Nos. 3,641,308 and 4,203,022. The '308 patent describes a nozzle for a plasma arc cutting torch where a laminar jet of a cooling liquid, usually water, surrounds and constricts the plasma. The liquid jet is created by a pair of generally annular members which together form the nozzle of the torch. The inner member has a central passageway that directs an ionizable gas from an electrode to a workpiece located below the electrode. The outer member cooperates with the inner one to create an annular nozzle that emits the liquid jet. The effectiveness of this system in concentrating the arc depends, in part, on the water mass flow rate and flow velocity creating the constricting water jet.

The '022 patent describes a method and apparatus for sensing the height of the torch over a workpiece, particularly as the torch is lowered toward the workpiece to begin cutting. Height sensing is important since the outer annular member of the torch nozzle is typically a ceramic material that can be damaged through contact with the workpiece. The '022 patent teaches that a gas flow can be introduced through the gas system as the torch is lowered. The gas stream swirls and has a vortex pressure. When the torch is closely spaced from the workpiece, the vortex "attaches" to the workpiece resulting in an abrupt change in the vortex pressure. This change is sensed and gives the desired height information. One source of unreliability with this system arises out of residual water which is often present in the water ejection area of the nozzle, particularly when the nozzle is worn. Also, during the height sensing operation, if a droplet of residual water is ejected by the gas flow, the droplet can cause a pressure fluctuation which can be interpreted incorrectly as an indication that the torch is at the proper height over the workpiece.

More generally, the performance of a plasma arc cutting torch is directly related to the ability of the cutting system to cool the nozzle of the torch. The cooler the nozzle, the larger the current that the plasma can conduct. Also, a cool nozzle has an extended life since less scale and deposits form on the nozzle. In a water cooled torch of the general type shown in the '308 and '022 patents, heretofore it has not been possible to simply increase cooling by increasing the water flow because the laminar jet used to constrict the plasma is sensitive to flow parameters.

It is therefore a principal object of this invention to provide a plasma arc cutting torch that has its plasma arc concentrated by a jet of a cooling liquid while at the same time offering markedly increased cooling as compared to conventional torches of this type.

Another object is to provide a nozzle construction with an extended useful life.

A further object is to provide a nozzle construction which avoids unreliability in the initial height sensing due to the presence of residual water in the nozzle.

Yet another object is to provide an improved plasma arc cutting torch with the foregoing advantages which has a competitive cost of manufacture as compared to conventional torches of the same general type.

These and other objects and features will be more fully understood from the following detailed description which should be read in light of the accompanying drawings.

DETAILED DESCRIPTION OF THE PREFERRED EMBODIMENTS

Figure 1:
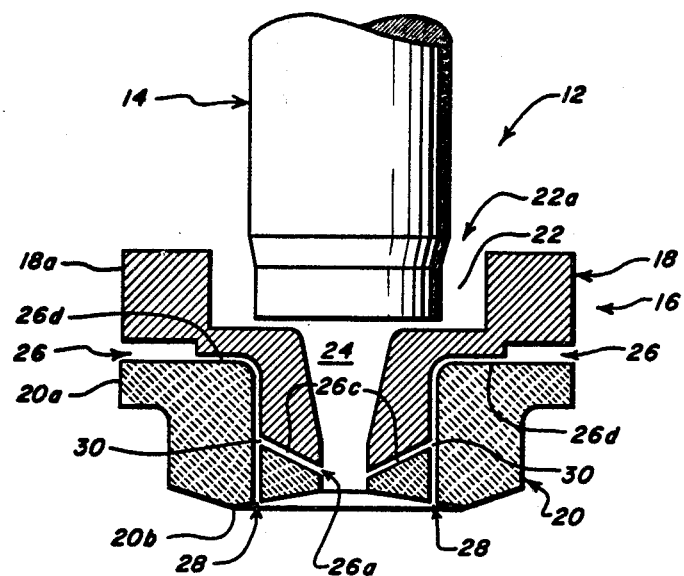
FIG. 1 is a view in vertical section showing the lower portion of a plasma arc cutting torch constructed according to the present invention.
Figure 2:
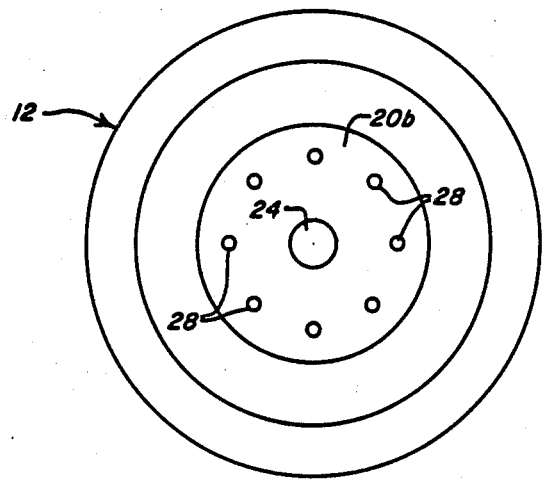
FIG. 2 is a bottom plan view of the torch shown in FIG. 1.

FIG. 1 shows the lower portion of a plasma arc cutting torch 12 of the general type described in U.S. Pat. Nos. 3,641,308 and 4,203,022 and manufactured and sold by Hypertherm, Inc. of Hanover, N.H. under the trade designation model PAC-500. A detailed description of the torch and its support systems can be found in these patents and will not be repeated here. This type of torch is conventionally operated to generate a plasma arc in an ionizable gas such as nitrogen ($N_2$) with a helical swirl being imparted to the gas within the torch to improve the characteristics of the cut. The arc extends generally from an electrode 14 to a metal workpiece such as a steel plate (not shown). The torch also uses a water injection system to cool its nozzle 16 and to constrict the plasma arc as it is emitted from the torch.

The nozzle 16 has two principal components, an inner nozzle member 18 and an outer member 20. The inner member 18 is typically made of copper and the outer element 20 is ceramic; both have a generally annular configuration. As shown, the ceramic member 20 generally surrounds the lateral and lower outer surfaces of the metallic member 18. The member 18, in combination with the electrode 16 defines a flow path 22 for the plasma gas. The gas enters the path 22 at the point 22a with a helical swirl imparted by a set of tangential ports in a ring (not shown) mounted just above the inner member. The plasma gas then flows downwardly through a central passageway 24 of the member 18 to the workpiece.

The members 18 and 20 are in a generally abutting relationship with one another except for a generally radially arrayed channel 26 formed at their interface and adapted to conduct a cooling fluid, typically water, from an annular region adjacent the upper lateral surfaces 18a and 20a of the members to a point 26a adjacent the plasma arc near its point of exit from the torch. Cooled water flowing through the channel 26 cools the member 18. Radial jet of water ejected from the channel at the point 26a creates a laminar jet of water which constricts and concentrates the plasma in the manner described in the aforementioned patents.

A principal feature of the present invention is a set of auxiliary ports 28 formed in the ceramic, outer member 20. Each port 28 extends from the channel 26 at a point 30 to the lower face 20b of the ceramic element. In the preferred form shown, there are eight auxiliary ports spaced generally equiangularly about the central passageway 24. Each port 28 is also spaced radially from the passageway 24 a sufficient distance that the effluent flow of cooling water from the ports 28 does not interfere with the cut. To the same effect, the ports 28 are directed generally vertically, parallel to the path of the arc from the electrode to the workpiece. The location and concentration of the ports 28 can vary provided that the effluent water does not interfere with the cut.

The ports 28 divert a portion of the cooling water from the channel 26 before they traverse the final length 26c of the channel (extending from the point 30 to the point 26a). As a result, there is an increased mass flow rate and/or flow velocity over the preceding, upstream portions 26d of the channel 26 as compared to conventional torches of this type where all of the nozzle cooling water is ejected into the laminar jet that constrains the plasma. This increased flow provides a greater cooling of the nozzle which in turn allows the nozzle to be operated at increased current levels or, for operation at conventional current levels, at a cooler temperature. With the present invention, it has been found that it is possible to increase the maximum current by approximately 25%. Cooler operating temperatures result in a longer nozzle life since they are associated with less scale and deposits being formed on the nozzle.

The dimensions of the ports 28 are selected in conjunction with those of the channel 26 so that the water flow through the channel portion 26c is at a sufficient rate and velocity to constrict the plasma arc as taught in the aforementioned patents. For the Hypertherm model PAC-500 torch with a 0.12 inch nozzle, the ports 28 should divert approximately 30% of the cooling water while 70% of the water flows through the channel portion 26c. A port diameter of approximately 0.032 inch has been found to be satisfactory. For different torches, however, the dimensions and ratios will, of course, vary. The percentage of water carried by the ports 28 will usually lie in the range of 20% to 50%.

The nozzle construction of the present invention is also useful in connection with the height sensing procedure which is the subject of U.S. Pat. No. 4,203,022. In that procedure, the supply of water to the water cooling system for the nozzle is shut off and a supply of gas is directed through the system. The tangential ports create a swirling movement in the gas to generate a vortex. The vortex is weak until the torch is close to the workpiece and "attaches" to it. This attachment is accompanied by an abrupt drop in the vortex pressure which is sensed by a transducer.

One problem with this system has been the presence of residual water in the channel 26 which can cause erratic pressure readings, commonly termed "spitting", or can result in a false indication that the torch is properly positioned due to the ejection of droplets of residual water. This latter situation is particularly troublesome when the nozzle becomes worn at the site of ejection and the residual water film is unstable. With the present invention, during the initial height sensing process the gas flow drives residual water out of the nozzle through the ports 28. The residual water therefore does not interfere with the height sensing process. It should also be noted that the effluent gas flow from the ports 28 also does not interfere with the height sensing.

While the invention had been described with respect to its preferred embodiments, it will be understood that various modifications and variations will occur to those skilled in the art from the foregoing detailed description and the accompanying drawings. Such modifications and variations are intended to fall within the scope of the appended claims.

What is claimed is:

1. In the method of initially positioning a plasma arc cutting torch relative to a workpiece, the torch being of the type in which a swirling motion is imparted to an ionizable gas through which the arc takes place, the flow of ionizable gas being initiated while the torch is in a retracted position and said swirling motion producing a vortex in said gas flow, the torch being advanced toward the workpiece, the advance being terminated in response to a sensed, abrupt change in the pressure of said vortex within the torch, and the torch having an internal passage system in its nozzle that conducts a cooling liquid through said nozzle, the improvement comprising providing a set of auxiliary ports each in fluid communication with said cooling passage system, said auxiliary ports diverting a portion of said cooling liquid and said gas from said nozzle, stopping the flow of said cooling liquid through said nozzle, and directing a stream of gas through said auxiliary ports while said torch is retracted from the workpiece at a sufficient flow rate and pressure to drive residual cooling liquid from said nozzle prior to cutting.

* * * * *